US005549942A

United States Patent [19]
Watts

[11] Patent Number: 5,549,942
[45] Date of Patent: Aug. 27, 1996

[54] SEALED DUCTBOARD

[76] Inventor: Anthony Watts, P.O. Box 411, Fort Ashby, W. Va. 26719

[21] Appl. No.: 488,964

[22] Filed: Jun. 8, 1995

[51] Int. Cl.$^6$ .................................................. F16L 59/02
[52] U.S. Cl. .................. 428/34.5; 428/36.91; 428/36.4; 428/60; 428/218; 138/143; 138/149; 138/DIG. 4
[58] Field of Search .................................. 138/139, 143, 138/149, DIG. 4; 428/34.5, 34.6, 53–56, 60, 122, 130, 156, 167, 172, 218, 171, 75, 170, 36.91, 36.4

[56] References Cited

U.S. PATENT DOCUMENTS

| | | | |
|---|---|---|---|
| 2,576,698 | 11/1951 | Russum | 428/75 |
| 3,031,358 | 4/1962 | Rutter et al. | 428/163 |
| 3,078,880 | 5/1953 | Stephens | 138/DIG. 11 |
| 3,092,529 | 6/1955 | Pearson | 138/149 |
| 3,141,809 | 7/1964 | Di Maio et al. | 428/218 |
| 4,183,379 | 1/1980 | Marquette et al. | 138/149 |
| 4,280,536 | 7/1991 | Gnant | 138/149 |
| 5,310,594 | 5/1994 | Holland et al. | 148/167 |

*Primary Examiner*—Charles Nold

[57] ABSTRACT

A duct for transporting air within an air handling system. The inventive device includes a plurality of panels coupled together to form a hollow duct. The panels are sealed along interior surfaces thereof by coextensive foil webs. The panels can be formed from a single blank and subsequently folded into an operative orientation for use in a heating and air conditioning installation.

1 Claim, 3 Drawing Sheets

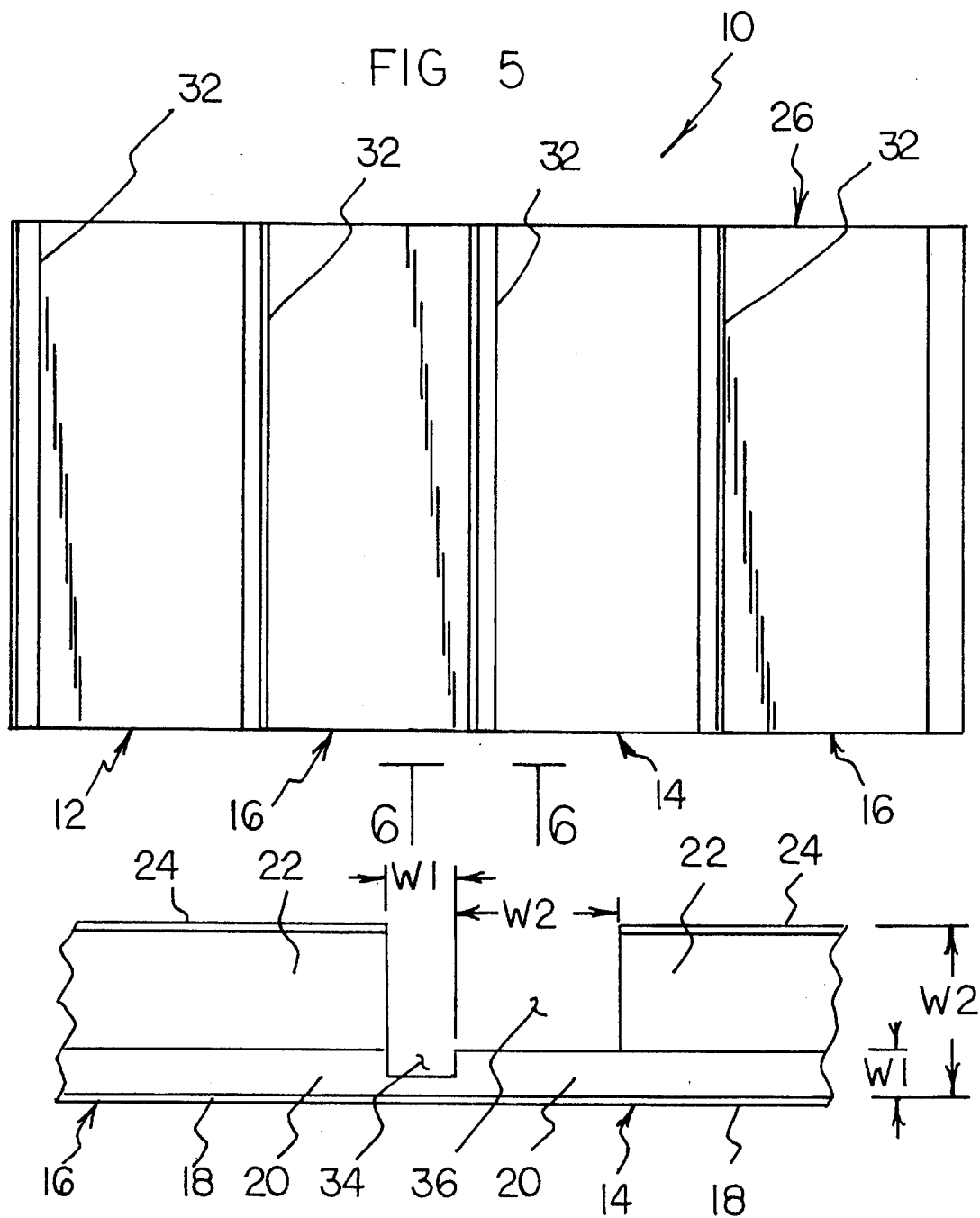

5,549,942

SEALED DUCTBOARD

BACKGROUND OF THE INVENTION

1. Field of the Invention

The present invention relates to air handling ducts and more particularly pertains to a sealed ductboard for transporting air within an air handling system.

2. Description of the Prior Art

The use of air handling ducts is known in the prior art. More specifically, air handling ducts heretofore devised and utilized are known to consist basically of familiar, expected and obvious structural configurations, notwithstanding the myriad of designs encompassed by the crowded prior art which have been developed for the fulfillment of countless objectives and requirements.

Known prior art air handling ducts include U.S. Pat. No. 4,990,370; U.S. Pat. No. 4,400,863; U.S. Pat. No. 5,298,299; U.S. Pat. No. 5,120,380; U.S. Pat. No. 3,986,470; and U.S. Pat. No. 4,196,755.

While these devices fulfill their respective, particular objectives and requirements, the aforementioned patents do not disclose a sealed ductboard for transporting air within an air handling system which includes a plurality of panels coupled together to form a hollow duct, the panels being sealed along interior surfaces thereof by coextensive foil webs, wherein the panels are formed from a single blank and can be subsequently folded into an operative orientation for use in a heating and air conditioning installation.

In these respects, the sealed ductboard according to the present invention substantially departs from the conventional concepts and designs of the prior art, and in so doing provides an apparatus primarily developed for the purpose of transporting air within an air handling system.

SUMMARY OF THE INVENTION

In view of the foregoing disadvantages inherent in the known types of air handling ducts now present in the prior art, the present invention provides a new sealed ductboard construction wherein the same can be utilized for transporting air within an heating and air conditioning installation. As such, the general purpose of the present invention, which will be described subsequently in greater detail, is to provide a new sealed ductboard apparatus and method which has many of the advantages of the air handling ducts mentioned heretofore and many novel features that result in a sealed ductboard which is not anticipated, rendered obvious, suggested, or even implied by any of the prior art air handling ducts, either alone or in any combination thereof.

To attain this, the present invention generally comprises a duct for transporting air within an air handling system. The inventive device includes a plurality of panels coupled together to form a hollow duct. The panels are sealed along interior surfaces thereof by coextensive foil webs. The panels can be formed from a single blank and subsequently folded into an operative orientation for use in a heating and air conditioning installation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carded out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sealed ductboard apparatus and method which has many of the advantages of the air handling ducts mentioned heretofore and many novel features that result in a sealed ductboard which is not anticipated, rendered obvious, suggested, or even implied by any of the prior art tool guides, either alone or in any combination thereof.

It is another object of the present invention to provide a new sealed ductboard which may be easily and efficiently manufactured and marketed.

It is a further object of the present invention to provide a new sealed ductboard which is of a durable and reliable construction.

An even further object of the present invention is to provide a new sealed ductboard which is susceptible of a low cost of manufacture with regard to both materials and labor, and which accordingly is then susceptible of low prices of sale to the consuming public, thereby making such sealed ductboards economically available to the buying public.

Still yet another object of the present invention is to provide a new sealed ductboard which provides in the apparatuses and methods of the prior art some of the advantages thereof, while simultaneously overcoming some of the disadvantages normally associated therewith.

Still another object of the present invention is to provide a new sealed ductboard for transporting air within an air handling system.

Yet another object of the present invention is to provide a new sealed ductboard which includes a plurality of panels coupled together to form a hollow duct, the panels being sealed along interior surfaces thereof by coextensive foil webs, wherein the panels are formed from a single blank and can be subsequently folded into an operative orientation for use in a heating and air conditioning installation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a plan view of the invention in a blank form.

FIG. 6 is an end elevation view taken from line 6—6 of FIG. 5.

DESCRIPTION OF THE PREFERRED EMBODIMENT

Figure 1:
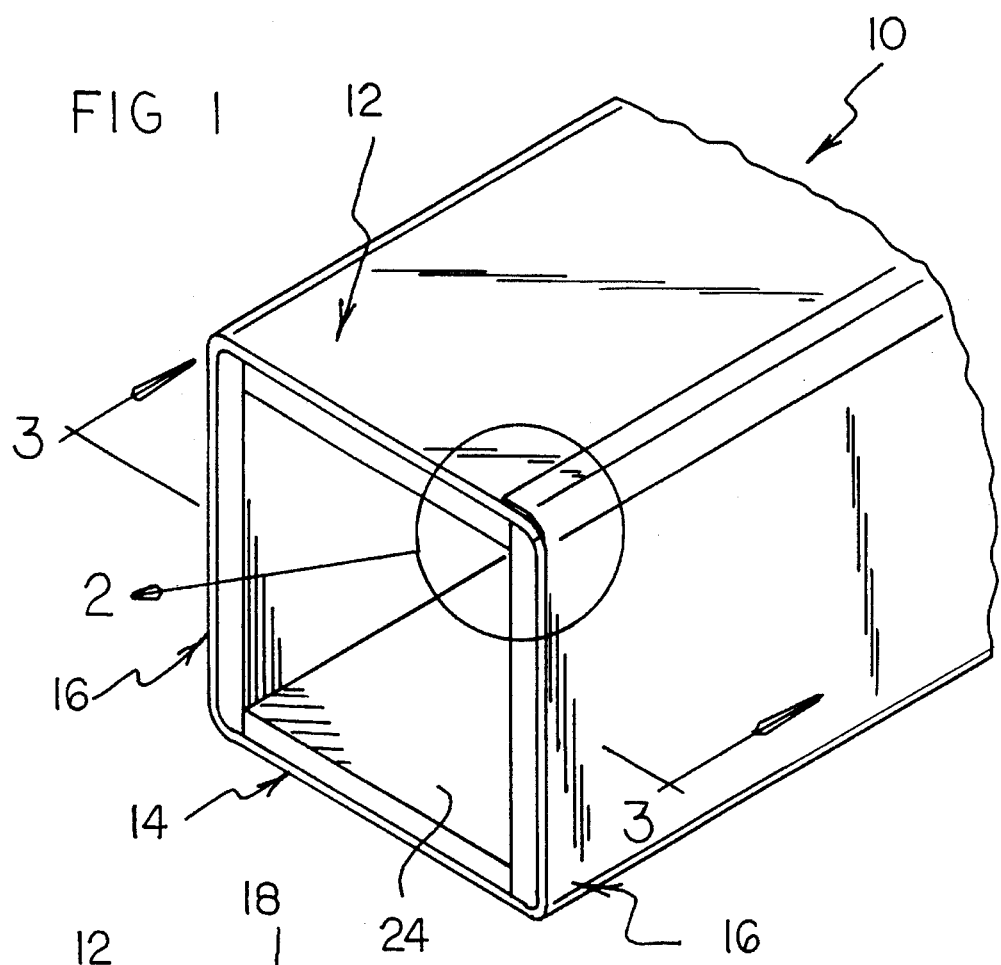
FIG. 1 is an isometric illustration of a sealed ductboard according to the present invention.

With reference now to the drawings, and in particular to FIGS. 1–6 thereof, a new sealed ductboard embodying the principles and concepts of the present invention and generally designated by the reference numeral 10 will be described.

Figure 2:
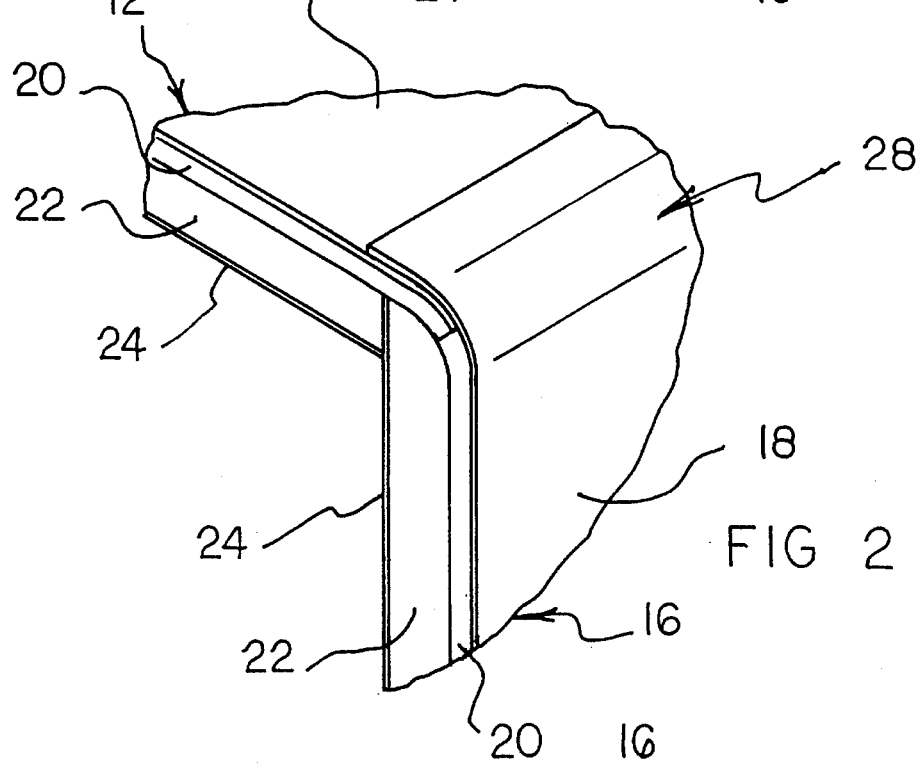
FIG. 2 is an enlarged isometric illustration of the area set forth in FIG. 1.
Figure 3:
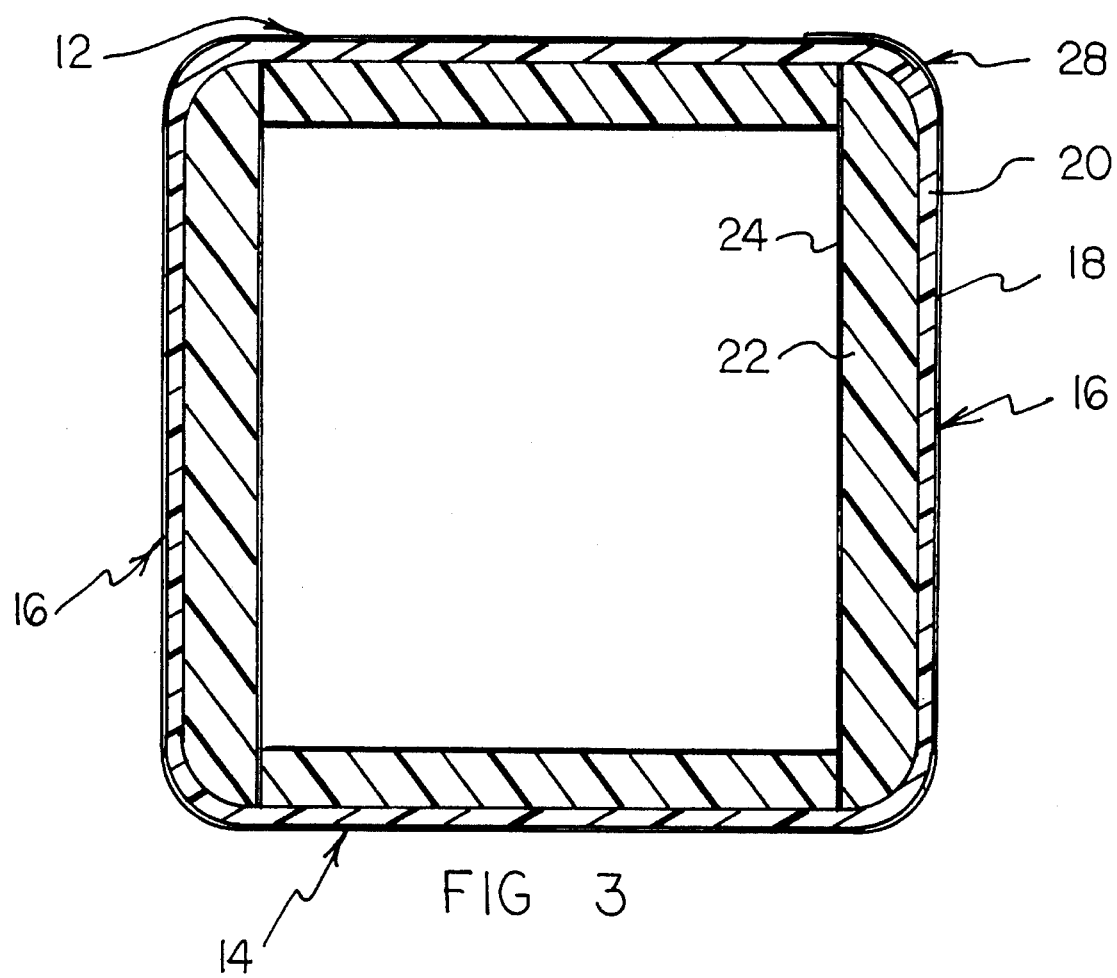
FIG. 3 is a cross sectional view taken along line 3—3 of FIG. 1.

More specifically, it will be noted that the sealed ductboard 10 comprises a substantially rectangular top panel 12 positioned in a spaced and parallel orientation relative to a substantially rectangular bottom panel 14. A pair of spaced and parallel lateral panels 16 extends substantially orthogonally between the top and bottom panels 12 and 14 so as to define a substantially rectangular shape of the ductboard when assembled as shown in FIG. 1 of the drawings. As shown in FIG. 2, each of the panels 12–16 includes an outer foil web 18 having an outer fiberglass web 20 coupled thereto. An inner fiberglass web 22 is coupled to the outer fiberglass web and is preferably of a disparate insulative valve relative to the outer fiberglass web 20. An inner foil web 24 is coupled to the inner fiberglass web 22 so as to define interior surfaces of the ductboard as shown in FIGS. 1 and 2 of the drawings. By this structure, the fiberglass webs 20 and 22 are sealed by the inner foil webs 24 from contact with air traveling through the device 10 when assembled as shown in FIG. 1.

Figure 4:
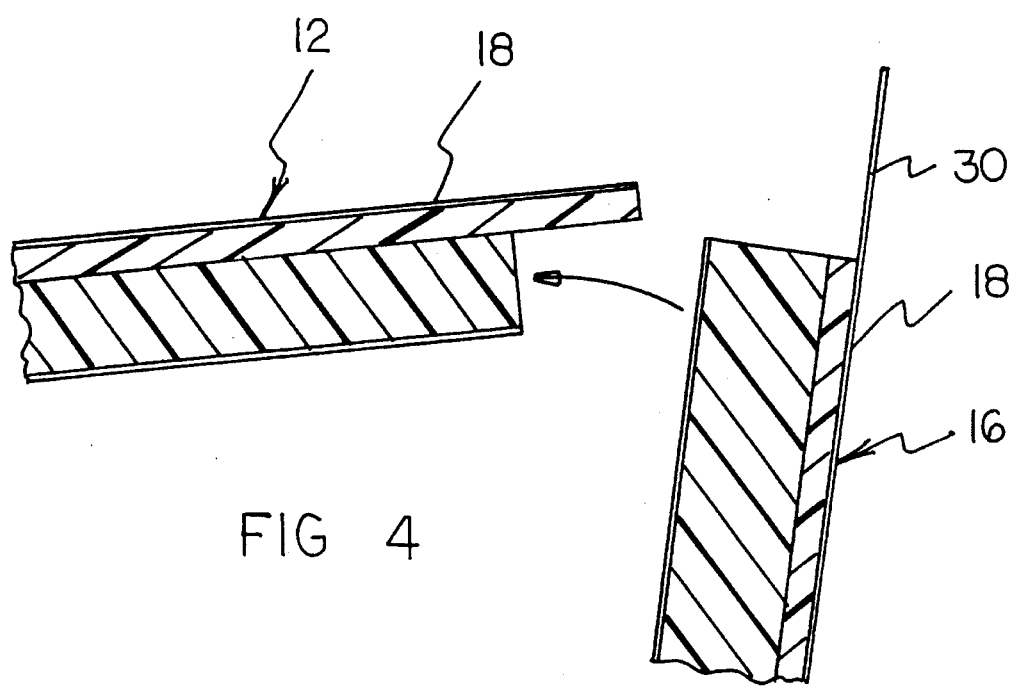
FIG. 4 is a cross sectional view, partially exploded, of a portion of the present invention.

As shown in FIG. 5, the sealed ductboard 10 is preferably provided in the form of a blank 26 which can be folded into the operative orientation illustrated in FIG. 1 of the drawings. During folding of the blank 26 into the operative orientation, a seam 28 is formed between a pair of adjacent panels. As shown in the Figures, the seam 28 extends between the top panel 12 and one of the lateral panels 16. To this end, and as shown in FIG. 4, the outer foil web 18 of one of the lateral panels 16 extends beyond the outer fiberglass web 20 and the inner fiberglass web 22 so as to define a securing flap 30 which can be adhesively or otherwise secured to the outer foil web 18 of the top panel 12. Such coupling of the securing flap 30 to the outer foil web 18 can be accomplished through a use of conventionally known adhesives or duct tape.

Referring now to FIGS. 5 and 6, it can be shown that the blank 26 is formed from a single coextensive outer foil web 18. The panels 12–16 are thus separated and defined by relief cuts 32 directed across the blank 26 and oriented in a substantially spaced and parallel orientation relative to one another. As shown in FIG. 6, each of the relief cuts 32 comprises a first relief groove 34 directed through the inner foil web 2,1, the inner fiberglass web 22, and into the outer fiberglass web 20. A second relief groove 36 is directed through both the inner foil web 24 and the inner fiberglass web 22 and positioned in contiguous communication with the first relief groove 34. Preferably, the first relief groove 34 is of a first transverse width "W1" which is substantially equal to a thickness of the outer fiberglass web 20. In a similar manner, the second relief groove 36 is preferably of a second transverse width "W2" equal to a combined thickness of the outer fiberglass web 20, the inner fiberglass web 22, and the inner foil web 24. By this structure, the panels 12–16 are permitted to fold into the orthogonal orientation illustrated in FIG. 1 of the drawings.

Preferably, the outer fiberglass web 20 is substantially rigid so as to impart structural integrity to the device 10 when assembled as shown in FIG. 1 of the drawings. The inner fiberglass web 22, in contrast to the configuration of the outer fiberglass web 20, is configured so as to be less dense than the outer fiberglass web 20, less rigid than the outer fiberglass web 20, and therefore more insulative than the outer fiberglass web 20. By this structure, the outer fiberglass web 20 imparts structural integrity to the assembly, with the inner fiberglass web 22 providing a thermal insulative barrier increasing efficiency of an associated heating and air conditioning installation. The outer foil web 18 protects the outer surfaces of the outer fiberglass web 20 and permits the device 10 to be provided in the blank form 26 illustrated in FIG. 5 of the drawings. The inner foil webs 24 cooperate to seal the inner fiberglass web 22 from contact with air traveling through the sealed ductboard when assembled as shown in FIG. 1, thereby satisfying certain building codes and precluding direct contact of the handled air with the fiberglass materials of the present invention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sealed ductboard comprising:
    a generally rectangular top panel having an outer foil web with an outer fiberglass web coupled thereto;

a generally rectangular bottom panel having the outer foil web with the outer fiberglass web coupled thereto;

a pair of spaced and panels lateral panels extending substantially or orthogonally between the top and bottom panels, each of the lateral panel having the outer for web with the outer fiber glass web coupled thereto;

the outer fiberglass web being substantially rigid, the inner fiberglass web being less rigid than the outer fiber glass web and more insulative than the outer fiber glass web, the inner fiber glass web of the top panel, bottom panel and lateral panels being coupled to the outer fiber glass of each panel, and forming an inner surface of each panel, the inner fiber glass web of each panel being sealed by the inner foil webs;

a blank being formed by a single coextensive outer foil web of the top panel, the bottom panel and the pair of lateral panels, the panels being separated and defined by relief cuts directed across the blank and oriented in a substantially spaced and parallel orientation relative to one another, the blank capable of being folded into an operative orientation about the relief cuts, the blank having a seam formed between a pair of adjacent panels, the seam being defined by a portion of the outer foil web of one of the panels extending beyond the outer fiberglass web so as to define a securing flap, the securing flap capable of being secured to the outer foil web of another of the panels; and each of the relief cuts having a first relief groove and a second relief groove, the first relief groove being directed through the inner foil web, the inner fiber glass web and into the outer fiber glass web, the second relief groove being directed through both the inner foil web and the inner fiberglass web, the second relief groove being positioned adjacent to and in contiguous communication with the first relief groove, the first relief groove being of a first traverse width which substantially equal to a thickness of the outer fiberglass web, with the second relief groove being of a second transverse width equal to a combined thickness of the other fiberglass web, the inner fiberglass web, and the inner foil web.

\* \* \* \* \*